(12) United States Patent
Fukami et al.

(10) Patent No.: US 6,787,829 B2
(45) Date of Patent: *Sep. 7, 2004

(54) LCD PANEL

(75) Inventors: Tetsuo Fukami, Moriguchi (JP);
Katsuhiko Kumagawa, Neyagawa
(JP); Hiroyuki Yamakita, Osaka (JP);
Masanori Kimura, Daito (JP);
Michiko Okafuji, Katano (JP); **Satoshi
Asada**, Kanazawa (JP)

(73) Assignee: **Matsushita Electric Industrial Co.,
Ltd.** (JP)

( * ) Notice: Subject to any disclaimer, the term of this patent is extended or adjusted under 35 U.S.C. 154(b) by 157 days.

This patent is subject to a terminal disclaimer.

(21) Appl. No.: 09/980,633

(22) PCT Filed: Apr. 5, 2001

(86) PCT No.: PCT/JP01/02969

§ 371 (c)(1),
(2), (4) Date: Dec. 5, 2001

(87) PCT Pub. No.: WO01/75516

PCT Pub. Date: Oct. 11, 2001

(65) Prior Publication Data

US 2002/0176043 A1 Nov. 28, 2002

(30) Foreign Application Priority Data

Apr. 5, 2000 (JP) .................................... 2000-103038
Oct. 26, 2000 (JP) .................................... 2000-326584

(51) Int. Cl.[7] ............................................ H01L 31/062
(52) U.S. Cl. ..................... 257/291; 257/184; 257/187; 257/203; 257/221; 257/292; 257/293; 257/461; 257/462; 257/929
(58) Field of Search ................................ 257/184, 187, 257/203, 221, 291–3, 433, 461; 349/73, 74, 82, 139, 141, 143, 144, 147

(56) References Cited

U.S. PATENT DOCUMENTS

| | | | |
|---|---|---|---|
| 5,870,160 A | 2/1999 | Yanagawa et al. | 349/141 |
| 5,995,182 A | 11/1999 | Watanabe et al. | 349/110 |
| 6,069,678 A | 5/2000 | Sakamoto et al. | 349/141 |
| 6,208,399 B1 * | 3/2001 | Ohta et al. | 349/139 |
| 6,233,034 B1 | 5/2001 | Lee et al. | 349/141 |
| 6,525,798 B1 * | 2/2003 | Yamakita et al. | 349/141 |

FOREIGN PATENT DOCUMENTS

| | | |
|---|---|---|
| EP | 0 943 953 A1 | 9/1999 |
| GB | 2 332 769 A | 6/1999 |
| JP | 09-061842 | 3/1997 |
| JP | 09-179096 | 7/1997 |

* cited by examiner

Primary Examiner—Long Pham
Assistant Examiner—Wai-Sing Louie
(74) Attorney, Agent, or Firm—Parkhurst & Wendel, L.L.P.

(57) ABSTRACT

A liquid crystal display panel of the invention is such that, in a pixel region defined by a region of the array substrate surrounded by a pair of image signal lines and a pair of scanning signal lines, of a line-shaped pixel electrode and a common electrode, the electrode that is disposed adjacent to and parallel to a signal line is made of an opaque conductor and at least one of the other electrodes is made of a transparent conductor. Adverse effects of the electric field formed between a signal line and an adjacent electrode thereto are suppressed and a sufficient aperture ratio is ensured by using a transparent conductor for the electrode contributing good display.

39 Claims, 11 Drawing Sheets

LCD PANEL

TECHNICAL FIELD

The present invention relates to a liquid crystal display panel, and more particularly to an improvement for obtaining better display quality in a horizontal electric field liquid crystal display panel, typified by an in-plane switching (IPS) mode liquid crystal display panel.

BACKGROUND ART

A liquid crystal display panel is an electro-optical device for displaying images in which an electric field is formed in a liquid crystal layer that is sandwiched between a pair of substrates and the intensity of the light transmitting through the liquid crystal layer is controlled by varying the orientation of liquid crystal molecules in the liquid crystal layer.

Systems for applying electric field across the liquid crystal layer are classified into two types: a so-called vertical electric field system such as twisted nematic (TN) mode, wherein a pair of electrodes for applying an electric field, which drives liquid crystal molecules, are provided on different substrates; and a so-called horizontal electric field system typified by IPS mode, wherein pairs of electrodes are provided on the same substrate.

An example of an IPS mode liquid crystal display panel is shown in FIG. 14. A comb-shaped pixel electrode 2 and a comb-shaped common electrode 1 are disposed in a pixel region, which consists of a region surrounded by a pair of image signal lines 5 and a pair of scanning signal lines 6. The common electrode 1 is electrically connected to a common electrode bus bar 9. The pixel electrode 2 and the common electrode 1 are electrically insulated from each other, and when a switching element 7 electrically connects the image signal line 5 and the pixel electrode 2 in response to the scanning signal supplied via the scanning signal line 6, an electric field is formed between the pixel electrode 2 and the common electrode 1 in the manner shown in FIG. 15.

The IPS mode liquid crystal display panel has an advantage over vertical electric field liquid crystal display panels in that the IPS mode LCD panel shows smaller hue variation dependent on viewing angle. However, the IPS mode LCD panel has a lower aperture ratio than that of the vertical electric field system and therefore requires a high power backlight to ensure sufficient display image brightness. In order to improve pixel aperture ratio, Japanese Unexamined Patent Publication No. 9-61842 suggests that a first or a second electrode (i.e., pixel electrode 2 or common electrode 1) be made of a transparent conductor.

Note that, as shown in FIG. 15, an electric field is formed between the image signal line 5 and a common electrode 1a disposed adjacent thereto. Accordingly, the liquid crystal molecules located in the region designated by the slanted lines in FIG. 14 do not behave in the same fashion as do those located between the pixel electrode 2 and a common electrode 1b, but are driven by the electric field formed between the common electrode 1a and the image signal line 5. Therefore, this region does not exhibit a brightness that is required for the image to be displayed. In the operation of a liquid crystal display panel, generally, the polarity of the potential $V_S$ of the image signal line 5 is inversed with respect to the potential $V_C$ of the common electrode bus bar 9 so that the adjacent pixels or the adjacent lines have different polarities. For this reason, in cases where the polarity of the potential $V_{pix}$ of the pixel electrode 2 differs from that of the potential $V_S$, depending on various conditions such as shapes of the image signal line 5, the common electrode 1, and the pixel electrode 2, the gap of the pair of electrodes, the amplitude of $V_S$, and so forth, the potential $V_S$ affects the electric field formed between the common electrode 1a and the pixel electrode 2 to change the orientation state of the liquid crystal molecules located between these electrodes. Thus, brightness variation is sometimes caused within a pixel, which prevents good image display.

In particular, when the screen is viewed from an oblique direction, light transmitting through this region does not go through the black matrix disposed in the panel, and thereby displayed images are adversely affected. This phenomenon greatly reduces the advantage of having a wide viewing angle that is attained by the horizontal electric field system liquid crystal display panel. It is possible to reduce the adverse effect by using a wide black matrix, but this technique reduces aperture ratio as a function of the relationship of the widths and the positions between the black matrix and the common electrodes.

In the prior art technique of the above-described publication, if the common electrode line 1a that is adjacent to the image signal line 5 is made of a transparent material, displayed image quality degrades because the region that shows a brightness different from a desired brightness is made to be a display region. That is, the mere use of a transparent electrode only exacerbates image quality degradation caused by this region. In view of this problem, by increasing the width of the common electrode 1a adjacent to the image signal line 5, for example, it is possible to reduce the adverse effect of the electric field formed between the image signal line 5 and the common electrode 1a, which influences the brightness of the pixel. However, this technique requires a large non-display region, lowering the aperture ratio, which is not particularly high in comparison with liquid crystal display panels of other display modes. To maintain brightness of the liquid crystal panel while maintaining the aperture ratio, the output power of the backlight needs to be increased. Consequently, an increase in power consumption is inevitable.

When the area per pixel is reduced to obtain higher resolution, the aperture ratio of the pixels accordingly decreases unless the widths of the pixel electrode and the counter electrode are reduced in proportion to the area. The above-mentioned prior art technique can reduce pixel size without decreasing the aperture ratio, but display quality is lowered because the region between the common electrode 1a and the image signal line 5 becomes a display region.

Japanese Unexamined Patent Publication No. 9-179096 proposes, as shown in FIG. 16, a liquid crystal display panel that has a conductive layer 50 covering portions of an image signal line 5 and a common electrode (reference electrode) 1, the conductive layer formed thereover and over an insulating layer (not shown). According to the publication, the electric field formed in the liquid crystal layer due to the potential of the image signal line 5 is shielded by the conductive layer 50 and therefore does not reach the common electrode 1. However, in this technique, since a capacitance is formed between the image signal line 5 and the conductive layer 50, undercharging caused by a large wiring time constant and consequent signal waveform deterioration occurs when the panel size is large and the image signal lines are accordingly long. Moreover, in cases where the insulating film has defects, such as pinholes, a short circuit between the image signal line and the conductive layer occurs, resulting in display defects.

DISCLOSURE OF THE INVENTION

It is an object of the present invention to provide a liquid crystal display panel that solves the foregoing problems of the prior art, has a high aperture ratio, and controls the image quality degradation caused by the electric field generated between the image signal lines and the common electrodes adjacent thereto.

A liquid crystal display panel according to the present invention has a line-shaped pixel electrode and a line-shaped common electrode disposed in each of pixel regions of the array substrate that is surrounded by a pair of image signal lines and a pair of scanning signal lines, and of these line-shaped electrodes, the electrodes that are disposed adjacent to and parallel the signal lines are made of an opaque conductor and at least one of the other electrodes is made of a transparent conductor.

To ensure a high aperture ratio, all the electrodes other than the ones adjacent to the signal lines are made of a transparent conductor.

The present invention may be applied to a so-called IPS mode liquid crystal display panel in which line-shaped pixel electrodes and common electrodes are provided on the array substrate side, as well as a liquid crystal display panel in which all or some of the common electrodes are provided on the counter substrate side.

In a preferred aspect of the invention, a portion of an electrode made of a transparent conductor is disposed on the array substrate so as to overlap, from the inside of the pixel, with a portion of an opaque electrode adjacent to an image signal line or a scanning signal line. That is, by disposing a transparent electrode on the side that contributes to good display, pixel aperture ratio is ensured and by disposing an opaque electrode on the signal line side, the light transmitting the region is shielded to suppress adverse effects of the region that influence display.

In another preferred aspect of the invention, an electrode adjacent to a signal line is provided with an inclined surface inclined toward the other side, i.e., toward an adjacent electrode. Thereby, a region in which electric flux lines are formed between the electrode and the adjacent electrode, i.e., a region that contributes to good display, is enlarged. For example, by using a combination type electrode in which portions of the electrodes overlap with each other, the electrode disposed in an upper layer is provided with an inclined surface in a region where the electrodes are overlapped.

In a further another preferred aspect of the invention, an electrode having a potential equal to that of the electrode adjacent to a signal line is disposed on the surface of the counter substrate so as to oppose the signal line. When the material of this electrode is a transparent conductor, display brightness is ensured. In addition, by providing this electrode so as to cover the electrode adjacent to the signal line, it is possible to suppress adverse effects of the potential of the signal line that influence the electric field formed between the electrode adjacent to the signal line and the electrode adjacent thereto.

In another liquid crystal display panel according to the present invention, as is the case with the foregoing, the line-shaped pixel electrode and common electrode are disposed in a pixel region, and in the centerline of the surface of the electrode that is disposed adjacent to and parallel to one of the image signal lines or one of the scanning signal lines, an electric flux line of an electric field formed between the electrode and an electrode adjacent thereto is inclined toward the adjacent electrode with respect to the direction of the normal of the array substrate.

In another preferred aspect of the invention, an electrode adjacent to a signal line has a surface inclined toward the other side, i.e., the adjacent electrode side. Thereby, a region in which electric flux lines are formed between the electrode and an electrode adjacent thereto, that is, a region that contributes to good display, is increased. For example, by employing a combination type electrode in which portions of the electrodes are overlapped such as described above, an inclined surface is formed in the region in which the electrodes are overlapped.

Still another liquid crystal display panel according to the invention has a light shielding member shielding a light transmitting a region between a signal line and an electrode adjacent thereto. The light shielding member is, for example, disposed on the array substrate side. When it is disposed in a layer lower than the electrode, the electrode formed in a peripheral region of the light shielding member is provided with an inclined surface.

The light shielding member is, for example, made of a conductive material, and more preferably, is electrically insulated from the surrounding component members.

In order to completely eliminate adverse effect of the light that transmits the region between a signal line and an electrode adjacent thereto, it is preferable that a black matrix is disposed so that it covers an area extending from the edge of the electrode adjacent to and parallel to one of the scanning signal lines or one of the image signal lines for a distance d·tan $θ_t$, where d is the thickness of the liquid crystal layer and $θ_t$ is the angle formed by a direction of the normal of the surface of the array substrate and a proceeding direction of a light that has transmitted through the liquid crystal layer when the light undergoes total reflection at a boundary surface between the device and an outside.

DESCRIPTION OF THE REFERENCE CHARACTERS

| | |
|---|---|
| 1 | common electrode |
| 1a | first common electrode |
| 1b | second common electrode |
| 1c | third common electrode |
| 2 | pixel electrode |
| 3 | storage capacitor |
| 5 | image signal line |
| 6 | scanning signal line |
| 7 | switching element |
| 8 | insulating layer |
| 9 | common electrode bus bar |
| 10 | light shielding member |
| 91 | contact portion |
| 100 | liquid crystal layer |
| 101 | transparent substrate |
| 102 | counter substrate |
| 103 | array substrate |
| 104 | black matrix |
| 105 | color filter layer |

BEST MODE FOR CARRYING OUT THE INVENTION

Generally, image signal lines and scanning signal lines are arranged so as to be perpendicular to each other, and in each of the pixel regions, a pixel electrode and a common electrode are arranged so as to be parallel to one of the signal lines.

Pixel electrodes have respective independent potentials between pixels, whereas the common electrodes of all the pixels, or of all the pixels connected to a same scanning signal line, are set at the same potential by common electrode bus bars, and thus, it is the common electrodes that are usually provided adjacent to signal lines. Accordingly, the following embodiments describe cases in which, in pixels, pixel electrodes and common electrodes are arranged parallel to image signal lines and common electrodes are disposed adjacent to image signal lines. However, depending on pixel construction, there are cases in which these electrodes are disposed parallel to scanning signal lines or the pixel electrodes are disposed adjacent to signal lines. In such cases, the words and phrases in the following embodiments should be interpreted accordingly.

Now, with reference to the drawings, preferred embodiments of the present invention are detailed below.

Embodiment 1

Figure 1:
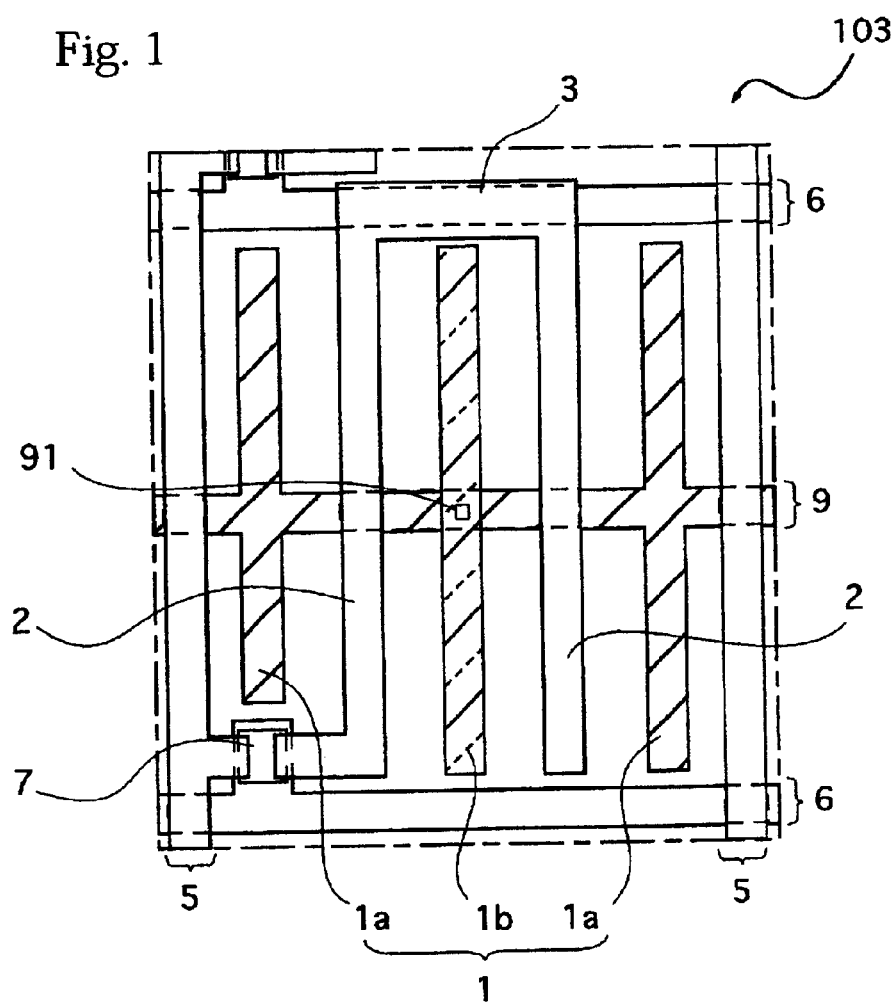
FIG. 1 is a plan view showing an essential portion of a liquid crystal display panel in accordance with an embodiment of the present invention.
Figure 2:
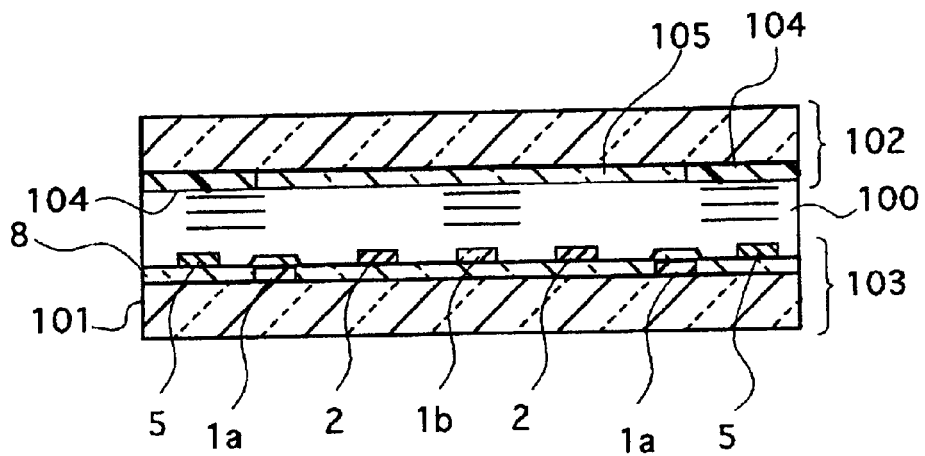
FIG. 2 is a schematic vertical cross-sectional view showing an essential portion of the array substrate of the liquid crystal display panel.

The construction of a pixel in the liquid crystal display panel of the present embodiment is shown in FIGS. 1 and 2.

This liquid crystal display panel is that of a so-called IPS (in-plane switching) mode in which a comb-shaped common electrode 1 and a comb-shaped pixel electrode 2 are disposed on a substrate 103, which is one of a pair of substrates (an array substrate 103 and a counter substrate 102) that are opposed to each other with a liquid crystal layer 100 interposed therebetween.

A switching element 7, which is provided for each pixel, is composed of a TFT, for example, and controls electrical connection between an image signal line 5 and the pixel electrode 2 in response to a signal supplied from a scanning signal line 6. The pixel electrode 2 has a storage capacitor 3 provided in the region overlapping with an adjacent another scanning signal line 6 in order to compensate for a decrease in the pixel electrode potential $V_{pix}$ that is caused by the leak current when the TFT is OFF.

A common electrode bus bar 9 formed parallel to the scanning signal line 6 so as to extend transversely across the pixel is electrically connected to the common electrode 1.

Figure 13:
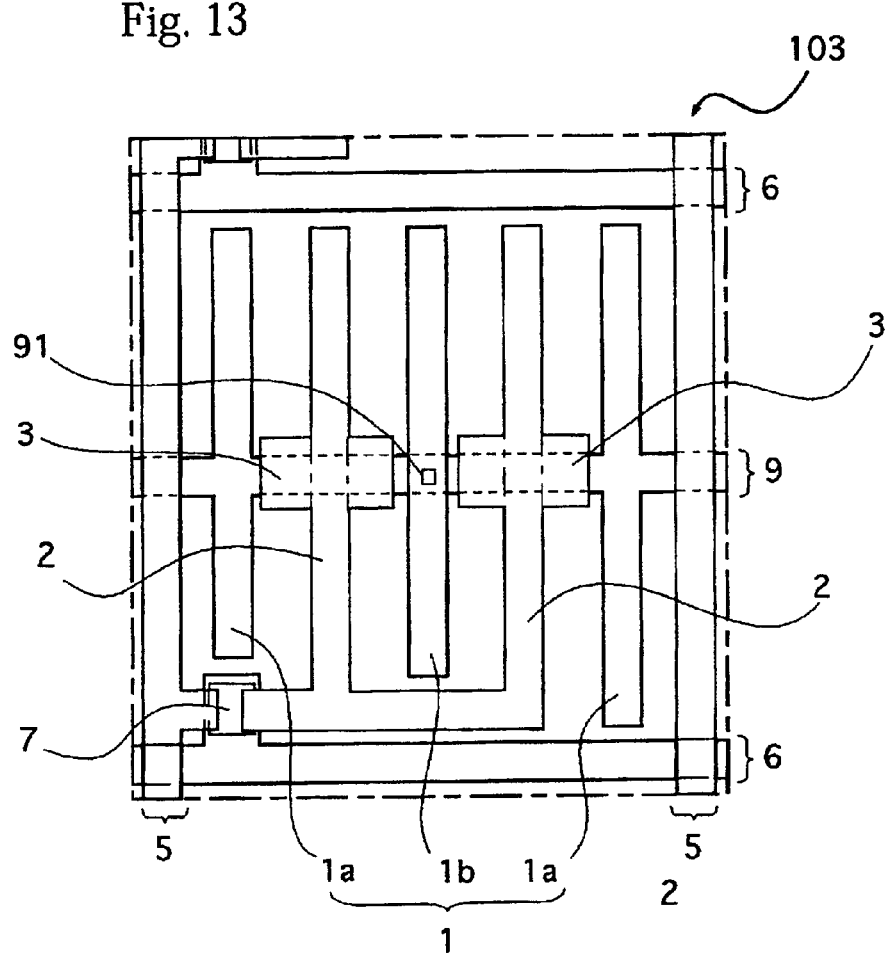
FIG. 13 is a plan view showing an essential portion of an array substrate of a liquid crystal display panel in accordance with further another embodiment of the present invention.
Figure 14:
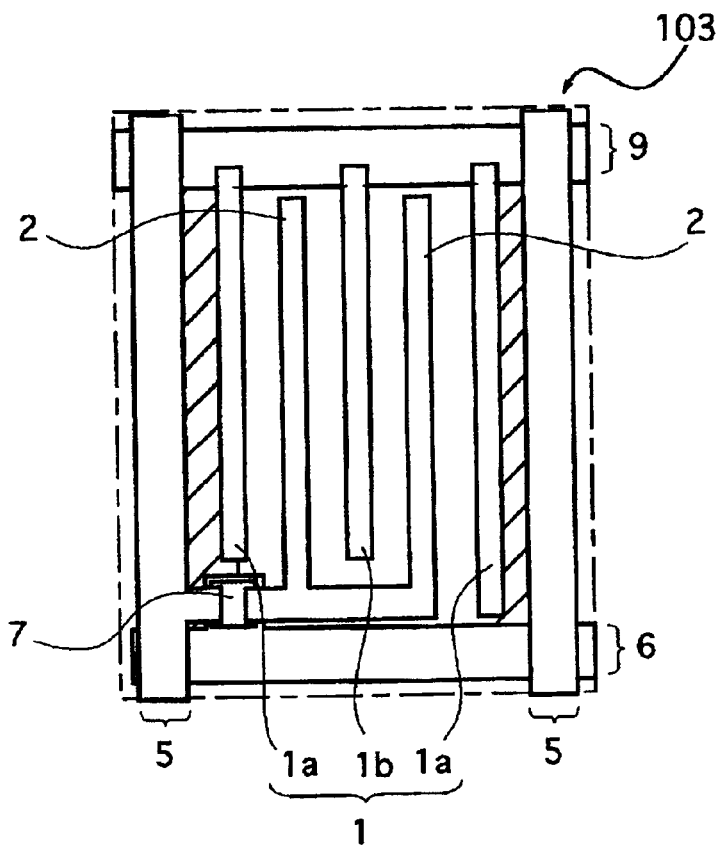
FIG. 14 is a plan view sowing an essential portion of an array substrate of a prior art IPS mode liquid crystal display panel.

In the liquid crystal display panel according to the present embodiment, of the three of the common electrode 1 disposed in a pixel, a first common electrode 1a adjacent to the image signal line 5 is made of an opaque conductor and a second common electrode 1b a transparent conductor, such as indium tin oxide (ITO). The first common electrode 1a is formed integrally with the common electrode bus bar 9. The second common electrode 1b is formed in a layer different from that of the common electrode bus bar 9 with an insulating film 8 interposed therebetween and is electrically connected to the common electrode bus bar 9 via a contact part 91. The storage capacitor 3 may be formed, as shown in FIG. 13, in a region between the common electrode bus bar 9 and the pixel electrode.

This liquid crystal display panel is fabricated in, for example, the following manner.

First, the first common electrode 1a, the common electrode bus bar 9, and the scanning signal line 6 are simultaneously formed on a surface of a transparent substrate composed of glass or the like. The scanning signal line 6 is provided with a protruding portion that is to be used as the gate electrode of the TFT.

After the common electrode bus bar 9 and so forth have been formed, an insulating film 8 is formed so as to cover the surface of the substrate 101, and then a semiconductor layer for a TFT serving as the switching element 7 is formed.

Subsequently, the pixel electrode 2 and the image signal line 5 are simultaneously formed. In this step, the pixel electrode 2 and the image signal line 5 are formed into patterns corresponding to the semiconductor layer so that portions thereof function as a drain electrode and a source electrode of the TFT.

In a region of the insulating film 8 that is over the common electrode bus bar 9, a hole is formed to serve as a contact portion 91 for connecting the second common electrode 1b and the common electrode bus bar 9, and thereafter, the second common electrode 1b made of a transparent conductor is formed. Then, an alignment film (not shown) is formed on the surface thereof to obtain an array substrate 103, and the array substrate 103 is arranged to be opposed to a counter substrate 102 having a black matrix and a color filter layer 105. A pair of major surfaces of the stacked members thus obtained are provided with polarizing plates, and a liquid crystal display panel is thus obtained.

In the present embodiment, adverse effects of undesirable behavior of liquid crystal that are caused by the electric field formed between the image signal line 5 and the adjacent common electrode 1a are reduced by using an opaque conductor for forming the common electrode 1a. When compared to a case where the common electrode 1a adjacent to the image signal line 5 is composed of a transparent electrode, brightness variation within each pixel is suppressed by preventing transmission of light through the common electrode 1a, and consequently, the quality of displayed images is improved. In addition, when a transparent conductor is used to form the rest of the common electrode 1, that is the common electrode 1b, which is sandwiched by a pair of pixel electrodes 2 and forms the electric field that contributes to normal image display, an improvement in aperture ratio is achieved, which has been a problem in liquid crystal display panels with a so-called horizontal electric field system such as IPS mode.

Embodiment 2

The present embodiment discusses an example in which defective display is reduced as in the same manner as the foregoing Embodiment 1, and aperture ratio is more effectively improved.

Figure 3:
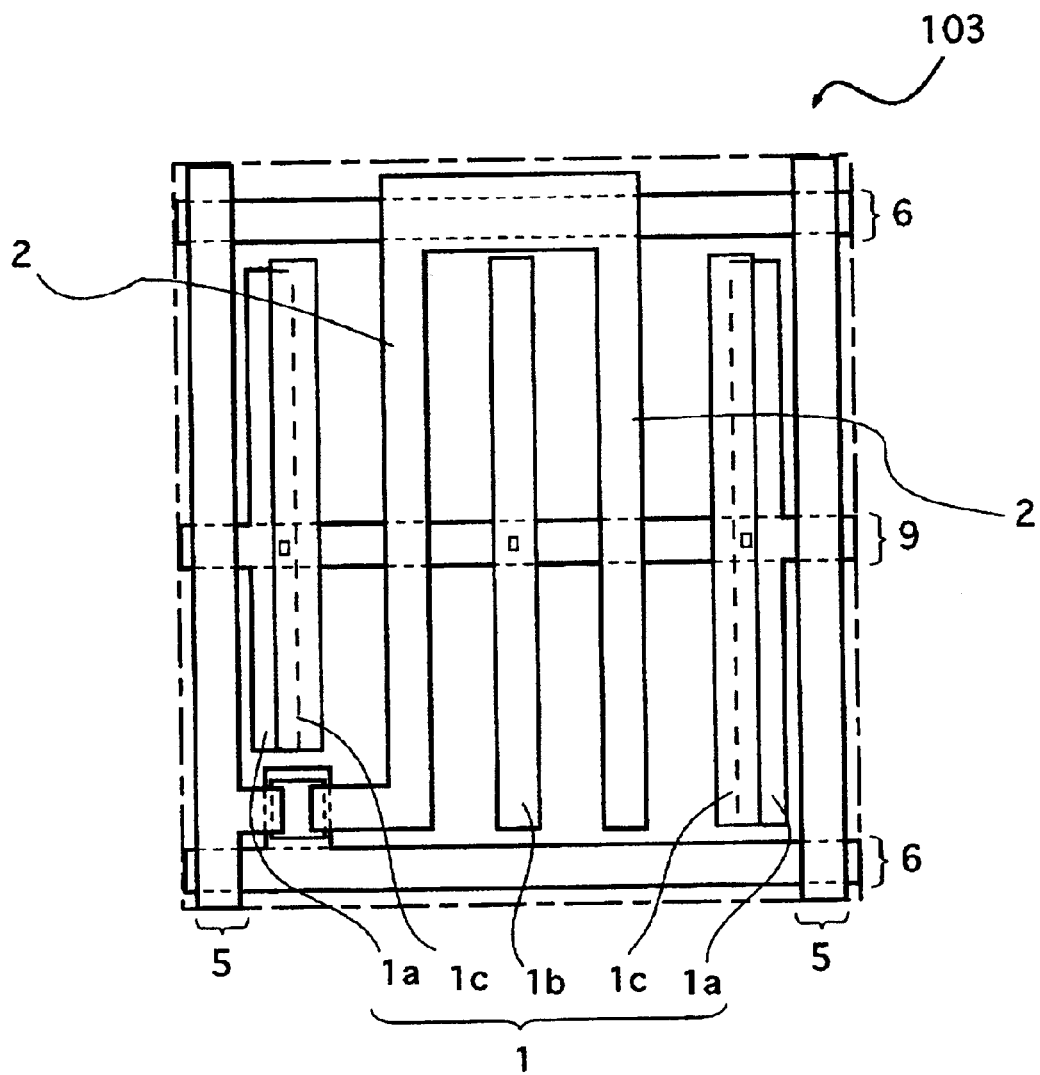
FIG. 3 is a plan view showing an essential portion of an array substrate of a liquid crystal display panel in accordance with another embodiment of the present invention.
Figure 4:
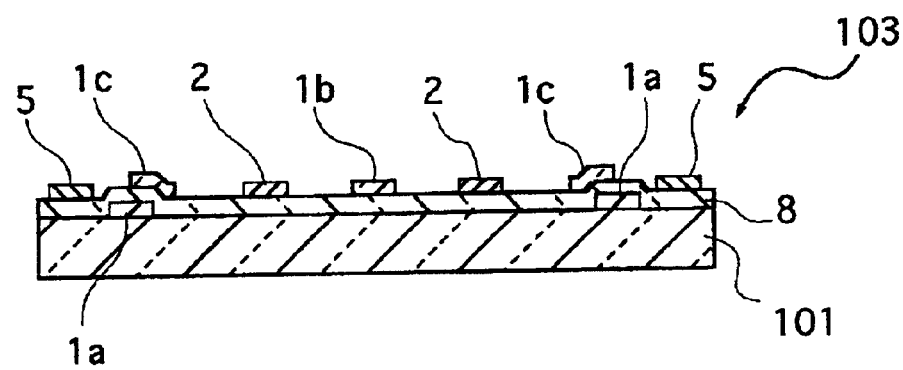
FIG. 4 is a schematic vertical cross-sectional view showing an essential portion of the array substrate.

The pixel construction of a liquid crystal display panel according to the present embodiment is shown in FIGS. 3 and 4.

As in the display panel of the foregoing Embodiment 1, the first common electrode 1a, which is adjacent to the image signal line 5, is made of an opaque conductor, and the second common electrode 1b, which is sandwiched between the pair of pixel electrodes 2, is made of a transparent conductor.

The liquid crystal display panel of the present embodiment also has a third common electrode 1c made of a transparent conductor and disposed to be adjacent to the common electrode 1a in such a manner that a portion of the third common electrode 1c is overlapped therewith.

Of course, the third common electrode 1c has the same potential as those of the first common electrode 1a and the second common electrode 1b. For example, the common electrodes 1b and 1c can be produced in the same manner as the foregoing Example 1, in the manufacturing step.

The first common electrode 1a and the third common electrode 1c, which is disposed to be in close adherence thereto, function as a single electrode. In the foregoing Embodiment 1, the first common electrode 1a disposed to be adjacent to the image signal line 5 forms an electric field that causes defective display on the image signal line 5 side but forms an electric field that contributes to normal display on the other side, i.e., on the side opposing the pixel electrode 2. In the present embodiment, this region which contributes to normal display is made of a transparent conductor, whereby an aperture ratio higher than that of the liquid crystal display panel of the foregoing Embodiment 1 is attained.

As a means to suppress the adverse effect of the potential of the image signal line which affects display, the area of the electrode adjacent thereto may be increased. However, simply employing a wide electrode only causes adverse effects. When the wide electrode is made of a transparent conductor, display image quality is degraded. When made of an opaque conductor, aperture ratio is degraded. Thus, by employing an electrode in which a transparent conductor and an opaque conductor are combined, aperture ratio is ensured while adverse effects of the image signal line potential on display image quality are suppressed.

Embodiment 3

Figure 5:
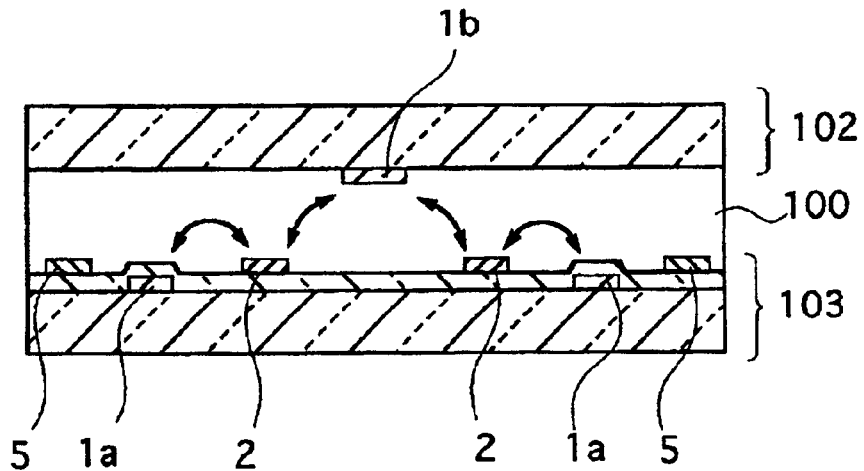
FIG. 5 is a schematic vertical cross-sectional view showing an essential portion of a liquid crystal display panel in accordance with further another embodiment of the present invention.

A liquid crystal display panel of the present embodiment is shown in FIG. 5.

In this liquid crystal panel, the opaque first common electrode 1a is disposed adjacent to the image signal line 5, as in the foregoing Embodiment 1, while the transparent second common electrode 1b is disposed on the counter substrate 102 side.

The first common electrode 1a and the pixel electrode 2 are formed over the array substrate 103 in the same manner as in the foregoing Embodiment 1.

Accordingly, between the second common electrode 1b and the pixel electrode 2 adjacent thereto, an electric field for image display is formed in a direction inclined with respect to the surface of the array substrate 103 (or the counter substrate 102).

In order to form both an opaque electrode pattern and a transparent electrode pattern on the same substrate as in the foregoing Embodiments 1 and 2, these patterns need to be formed in different layers, and therefore, it is necessary to provide a manufacturing step for forming a contact portion for electrically connecting these patterns.

Figure 6A:
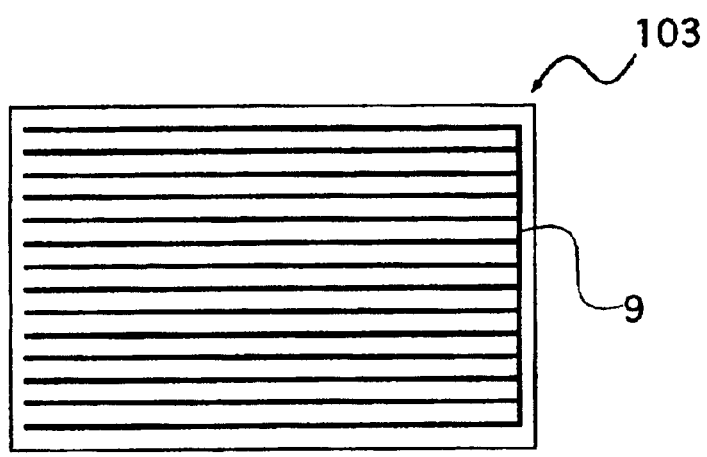
FIG. 6a is a schematic plan view showing the pattern of a common electrode bus bar, which is disposed over an array substrate of the liquid crystal display panel.
Figure 6B:
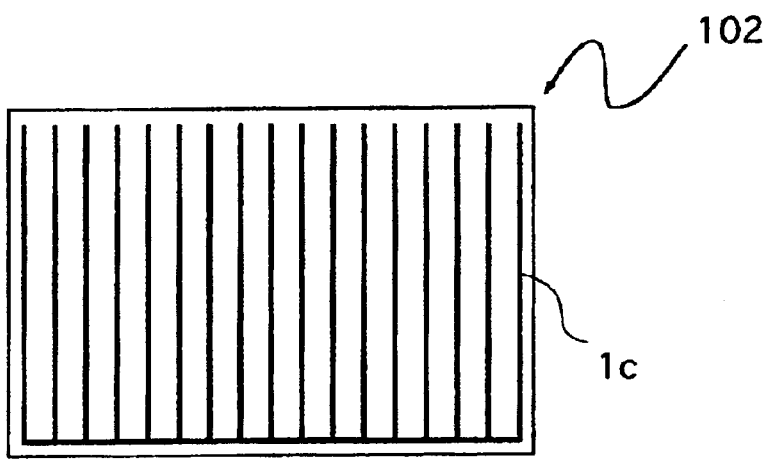
FIG. 6b is a schematic plan view showing a third common electrode disposed over a counter substrate of the liquid crystal display panel.

However, as in the present embodiment, by forming the transparent electrode on the other substrate (i.e., the counter substrate 102), the formation of a contact portion is made unnecessary. After the substrates have been attached together, the first common electrode 1a and the second common electrode 1b are easily connected using a conductive paste or the like. For example, all the common electrode bus bars 9 which are to be disposed over the array substrate 103 are integrally formed as shown in FIG. 6a, and in a similar manner, all the second common electrodes 1b disposed on the counter substrate 102 are integrally formed as shown in FIG. 6b.

Thus, according to the present embodiment, similar effects attained by the foregoing Embodiments 1 and 2 are achieved, and in addition, it is made possible to produce a liquid crystal display panel at an even lower cost and in an even simpler manner.

Embodiment 4

The present embodiment describes an example of a means for reducing adverse effects of image signal line potential that influence an adjacent electrode thereto.

Figure 7:
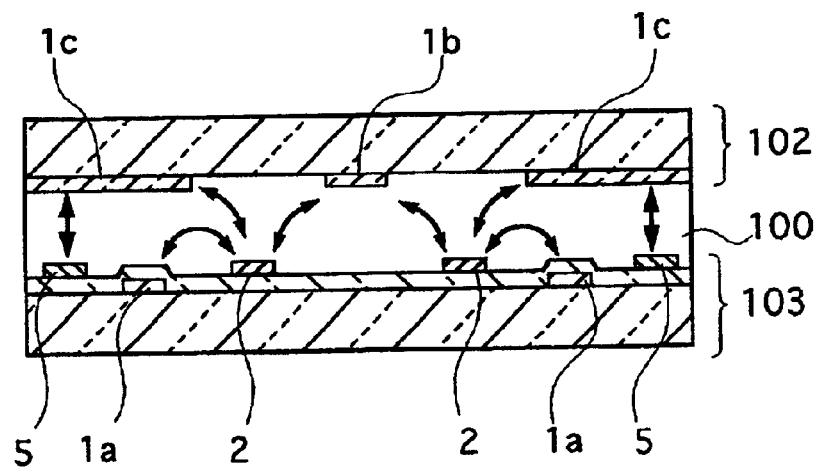
FIG. 7 is a schematic vertical cross-sectional view showing an essential portion of a liquid crystal display panel in accordance with yet another embodiment of the present invention.

An essential portion of a liquid crystal display panel of the present embodiment is shown in FIG. 7. This liquid crystal display panel has a third common electrode 1c disposed on the surface of the counter substrate 102 that opposes the image signal lines 5. Since an electric field is formed between the third common electrodes 1c and the image signal lines 5 as well as between the third common electrode 1c and the first common electrode 1a, adverse effects of the potential of the image signal line 5 that influence the common electrode 1a adjacent thereto are reduced.

Especially, as in the present embodiment, when a third common electrode 1c having a width greater than that of the image signal line 5 is disposed so as to cover the first common electrodes 1a in a pair of adjacent pixel regions that are isolated by the image signal line 5, adverse effects of the potential of the image signal line 5 that influence an adjacent pixel electrode 2 are also reduced.

Adverse effects of the electric field formed between the third common electrode 1c and the image signal line 5 that influence display image quality can be eliminated by shielding light transmitting through the region with a black matrix (not shown) that is disposed so as to oppose the image signal line 5 and the scanning signal line 6, as is the case with common liquid crystal display panels.

Embodiment 5

The present embodiment describes a means for reducing adverse effects of an electric field formed between an image signal line and an electrode adjacent thereto by controlling distribution density of the electric field.

In the present embodiment, a region effectively utilized for image display is widened by forming an electrode adjacent to an image signal line into a special shape.

In a region of the liquid crystal layer that includes an electric field formed between an image signal line and an electrode adjacent thereto, display cannot be controlled because the liquid crystal material is driven by this electric field. In view of this problem, generally, light transmitting this region that degrades display quality is shielded by a black matrix disposed on the counter substrate side. Thus, pixel aperture ratio is sacrificed in order to obtain good image display.

Figure 8:
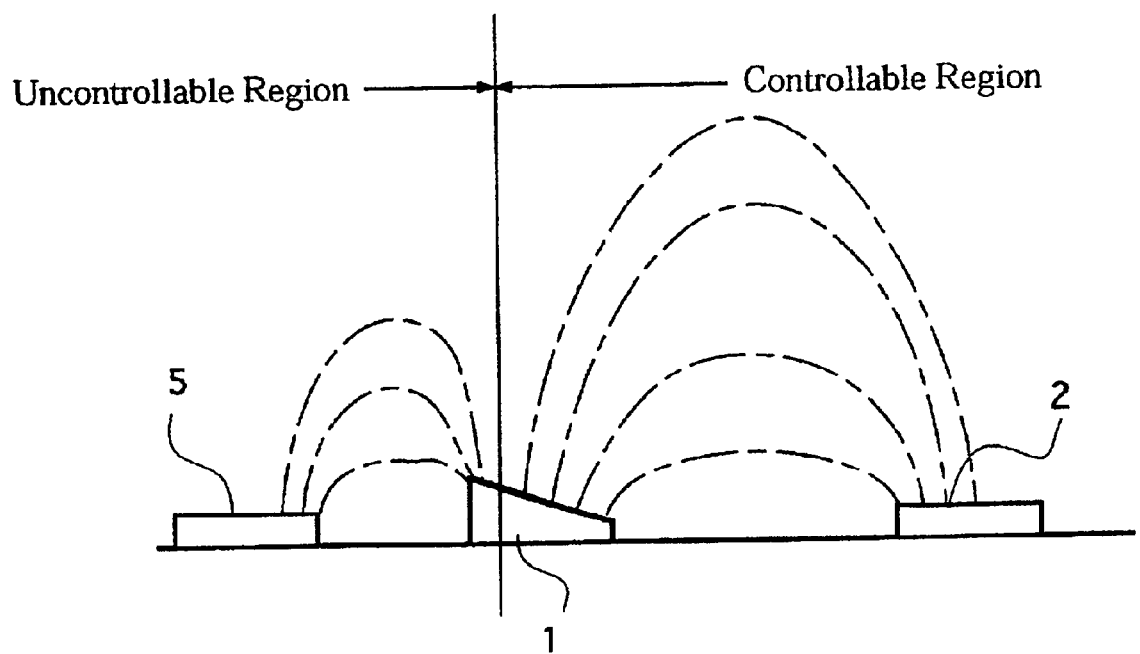
FIG. 8 is a schematic view showing the distribution of the electric field over a common electrode in still another embodiment of the present invention.
Figure 15:
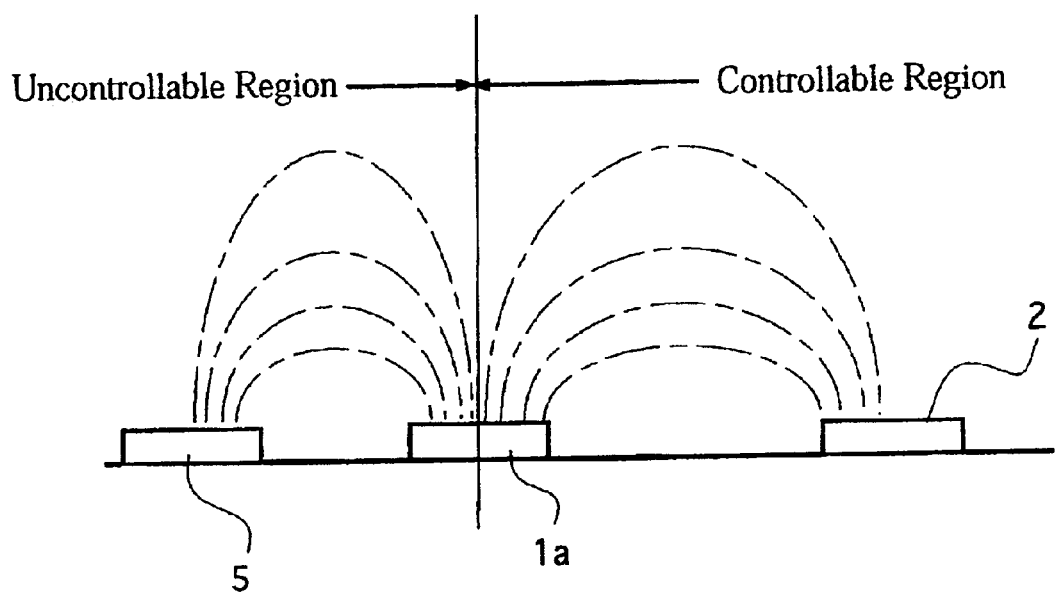
FIG. 15 is a schematic view showing the distribution of the electric field formed between a common electrode and an image signal line of the prior art liquid crystal display panel.
Figure 16:
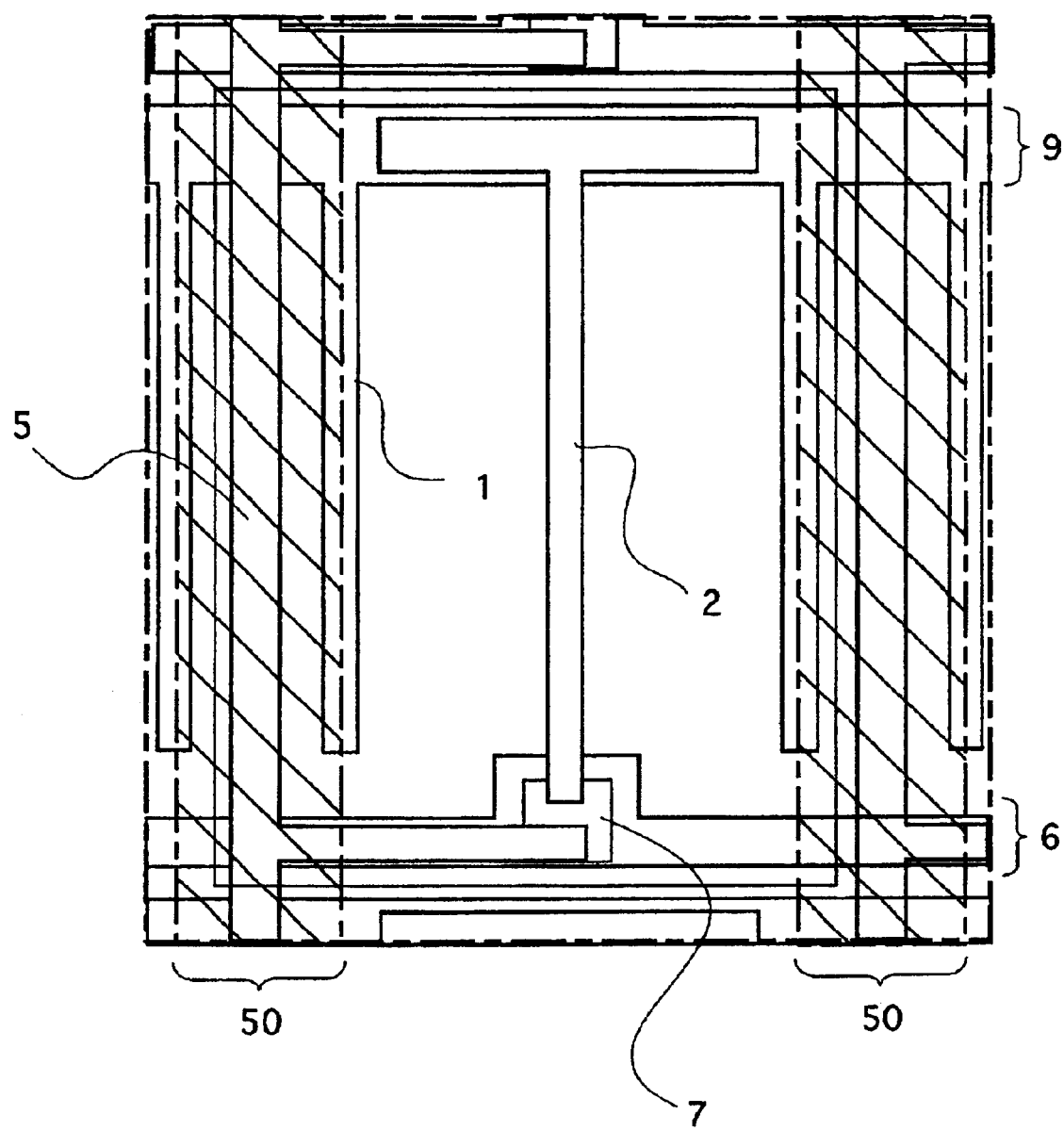
FIG. 16 is a plan view showing an essential portion of an array substrate of the IPS mode liquid crystal display panel used as a comparative example.

As shown in FIG. 15, in the uncontrollable region over the common electrode 1a adjacent to the signal line 5, electric flux lines formed on the electrode surface are inclined toward the signal line 5. In contrast, in the controllable region, electric flux lines are inclined toward the adjacent pixel electrode 2. This being the case, in the present embodiment, as shown in FIG. 8, a surface of the electrode 1 that is adjacent to the image signal line 5 is inclined so as to enlarge the controllable region. For the electrode adjacent to the signal line, an electrode having a surface inclined toward the other side, that is, toward an adjacent electrode, is employed, and thereby, it is made possible to reduce a region in which electric flux lines point in the direction of the normal or toward the signal line side, i.e., an undisplayable region.

Thereby, the width of the black matrix formed on the counter substrate side is reduced, and a liquid crystal display panel that is capable of bright display is achieved.

Figure 9A:
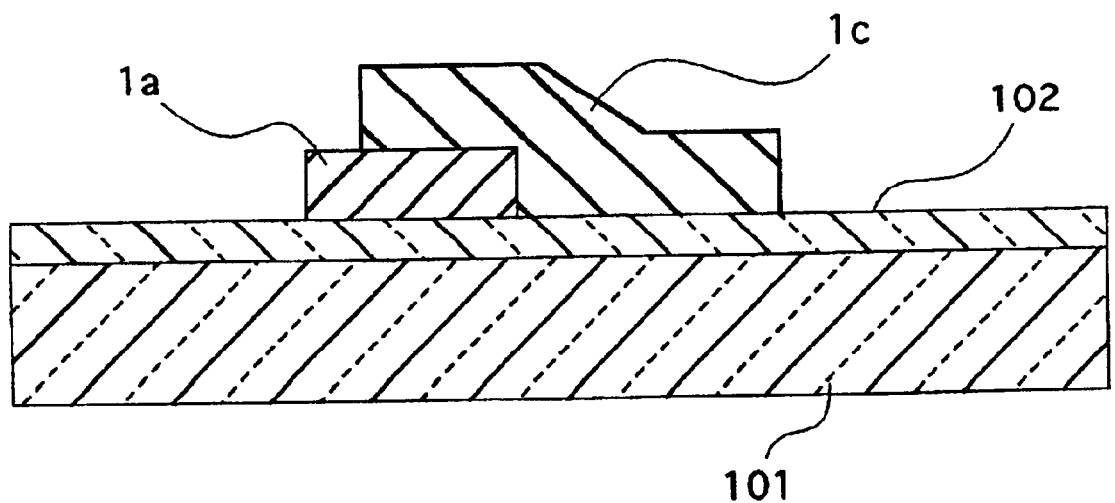
FIGS. 9a, 9b, 9c and 9d are schematic vertical cross-sectional views showing examples of the common electrode in the still another embodiment.
Figure 9B:
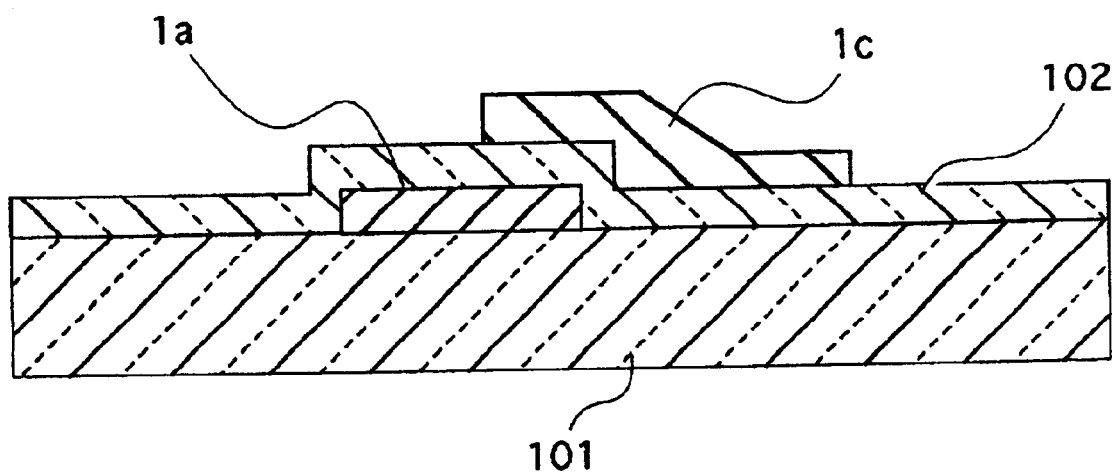

The inclined surface is formed on a combination type electrode in which portions thereof are overlapped with each other, such as the one described in the foregoing Embodiment 2. By overlapping the first common electrode 1a and the third common electrode 1c either directly as shown in FIG. 9a or indirectly as shown in FIG. 9b, the electrode 1c disposed in an upper layer is provided with an inclined surface formed over the step-shaped portion.

The use of a transparent conductor for the electrode 1c on the controllable region side is effective in increasing aperture ratio.

Figure 9C:
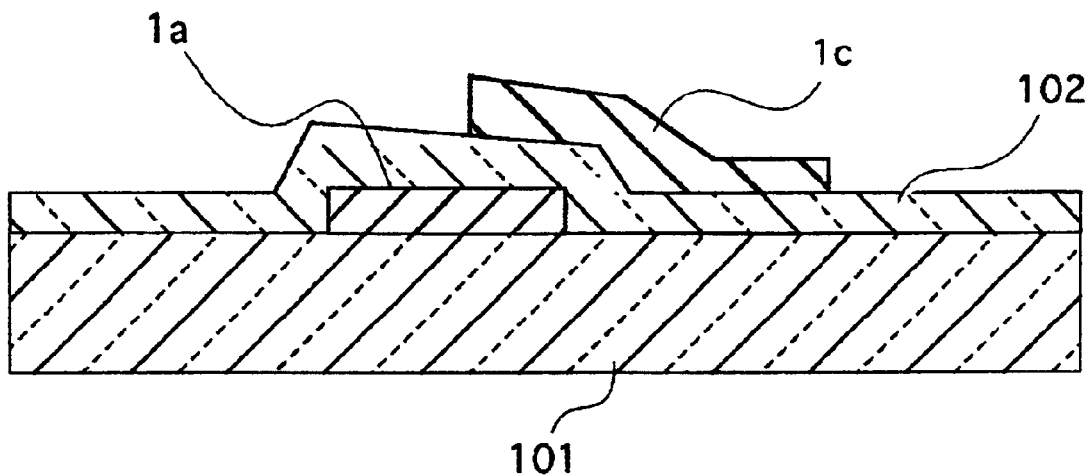
Figure 9D:
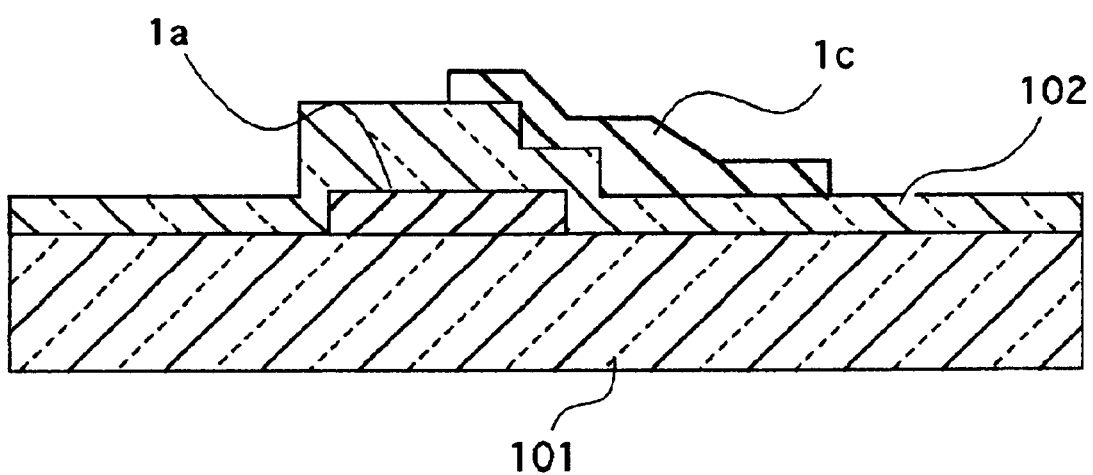

In addition, as shown in FIG. 9c, the surface on which the third common electrode is to be formed may have an inclination or a plurality of steps formed by, for example, etching. Moreover, it is possible to use an electrode having multiple steps on the surface or an electrode having a curved surface.

Embodiment 6

The present embodiment describes an example of a means for avoiding image quality degradation resulting from adverse effects caused by the electric field formed between a signal line and an electrode adjacent thereto.

Figure 10A:
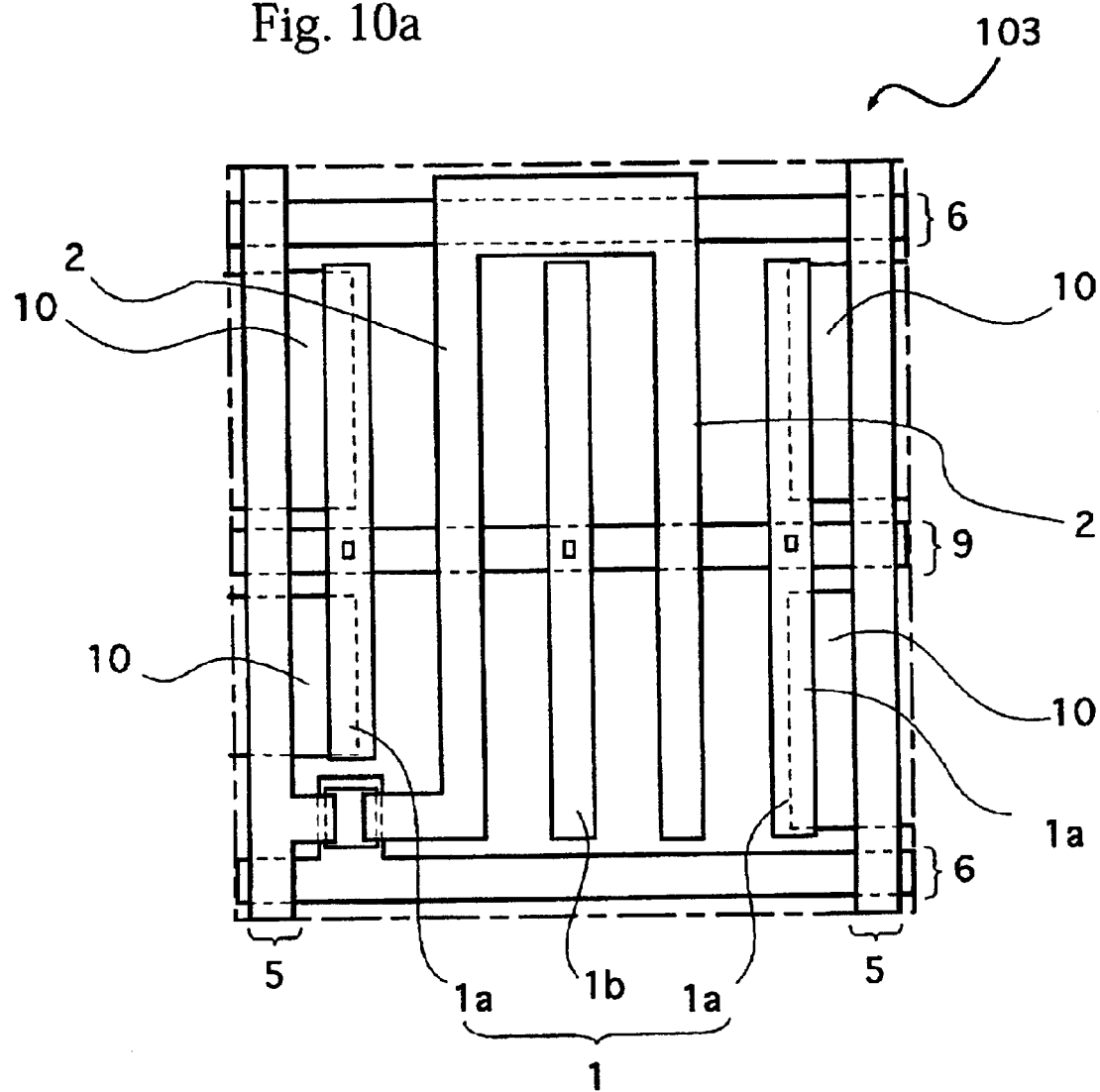
FIG. 10a is a plan view showing an essential portion of an array substrate of a liquid crystal display panel in accordance with further another embodiment of the present invention.
Figure 10B:
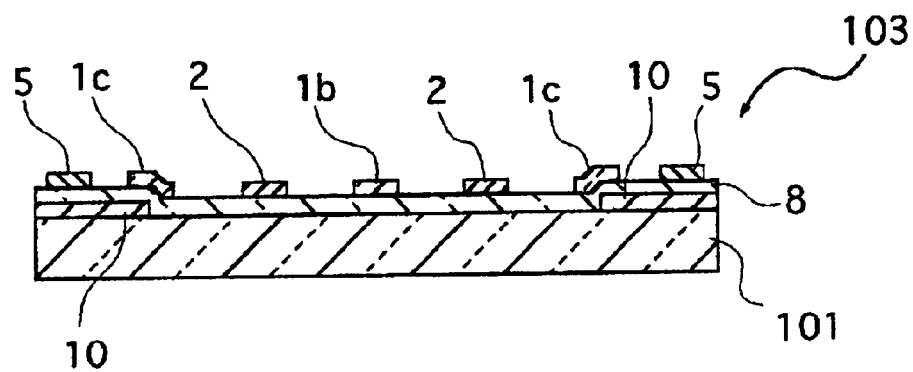
FIG. 10b is a schematic vertical cross-sectional view showing the essential portion of the array substrate.

A construction of a pixel region in a liquid crystal display panel of the present embodiment is shown in FIGS. 10a and 10b.

In a region between an image signal line 5 and a first common electrode 1a adjacent thereto, a light shielding element 10 made of an opaque material is disposed so as to be in a layer lower than those. The light shielding element 10 is disposed so that it overlaps with the first common electrode 1a and blocks light transmission through the region.

It is noted that in a case where a third common electrode made of a transparent conductor is disposed so as to overlap with the first common electrode 1a, the light shielding element 10 should be formed so that a region of the combined electrode through which light transmits is not covered.

The light shielding element 10 is, for example, formed in the same layer as the common electrode bus bar 9 by processing the same material as that of the common electrode bus bar. The light shielding element 10 is electrically insulated from the common electrode bus bar 9, and the gap therebetween contributes to an improvement in aperture ratio.

The light shielding element 10 is also electrically insulated from the image signal line 5, the first common electrode 1a, and so forth. As a consequence, even if these wiring lines and the light shielding element 10 are short circuited by dust contamination or the like during the manufacturing process, display defects are not created in the completed products. The use of a light shielding element 10 made of, for example, resin is more effective because it is thereby made unnecessary to take adverse effects of short circuiting into consideration.

In addition, by forming the light shielding element 10 in a layer lower than the common electrode 1, it is possible to form an inclined surface for the first common electrode, as is the case with the foregoing Embodiment 5. This also contributes to an increase in aperture ratio.

Figure 11A:
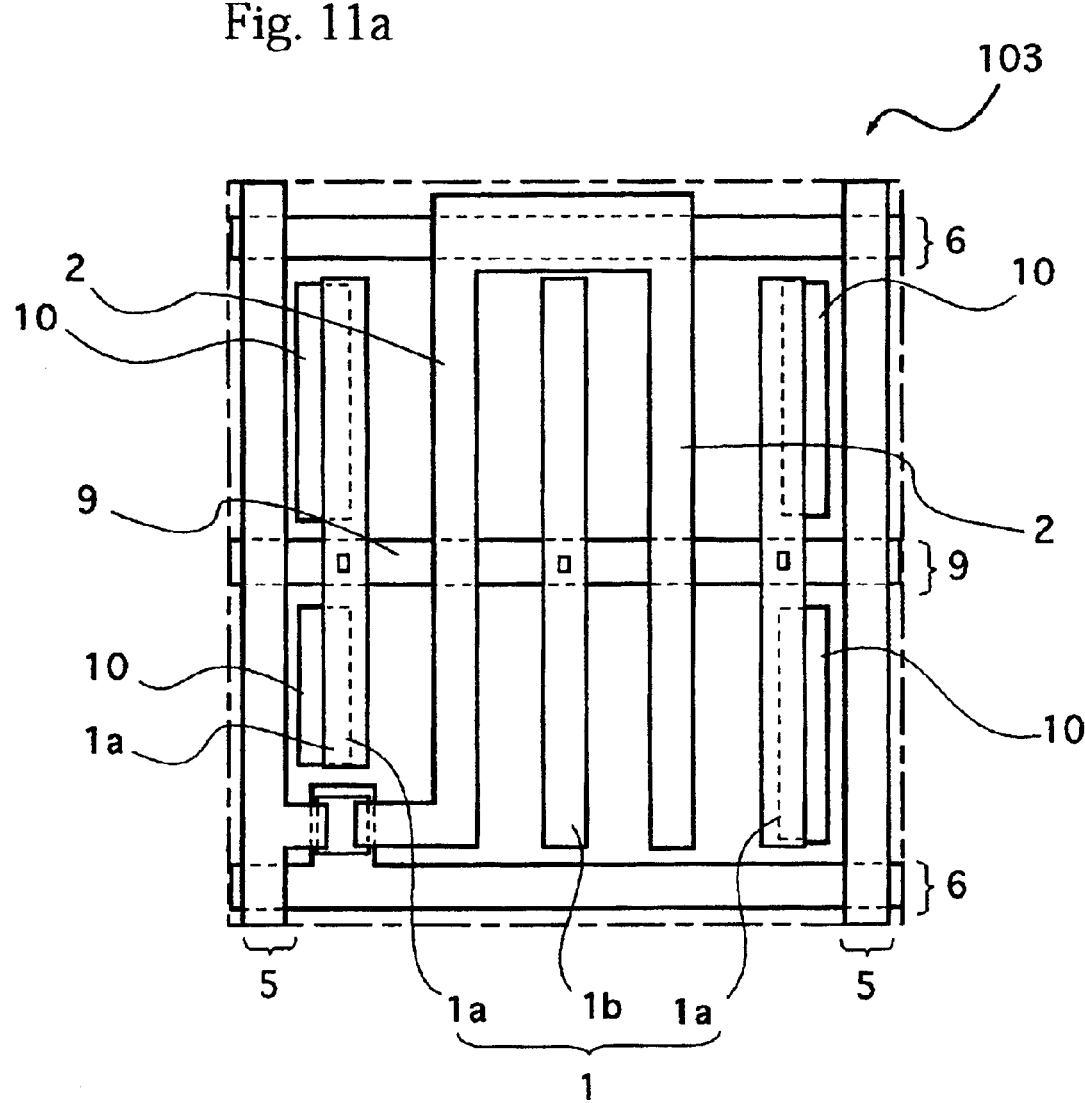
FIG. 11a is a plan view showing an essential portion of an array substrate of a liquid crystal display panel in accordance with further another embodiment of the present invention.
Figure 11B:
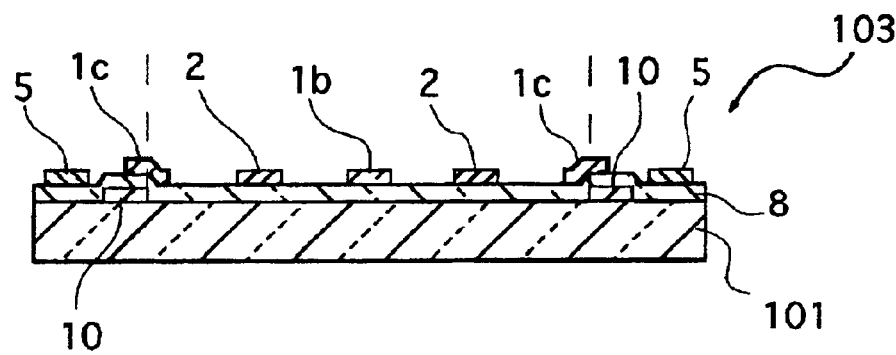
FIG. 11b is a schematic vertical cross-sectional view showing the essential portion of the array substrate.

It is noted that, as shown in FIGS. 11a and 11b, the light shielding element 10 may be disposed in only a portion of the region between the first common electrode 1a and the adjacent signal line so that a gap for transmitting light is provided between the light shielding element 10 and the image signal line 5. Thereby, it is made possible to prevent disconnection of the image signal line 5 caused by the steps that might be formed in cases where the light shielding element 10 is formed and thereafter the image signal line 5 is formed. It is also made possible to prevent short circuiting between the light shielding element 10 and the image signal line 5 or the like that possibly occurs when using a light shielding element 10 made of a conductor.

From the viewpoint of yield in the manufacturing process, it is desirable that the gap between the light shielding portion 10 and the scanning signal line 6 be larger than the gap between the common electrode 1a and the scanning signal line 6.

Embodiment 7

As explained in a previous embodiment, in order to effectively block the light that has transmitted through the undisplayable region, it is preferable that the black matrix be formed on the counter substrate so as to cover the undisplayable region, a region in which electric flux lines point in the direction of the normal or toward the signal line side on the surface of the electrodes, that is, to cover a portion of the electrode adjacent to the signal line. Thereby, when the liquid crystal display panel is viewed from the front, good display is obtained.

Figure 12:
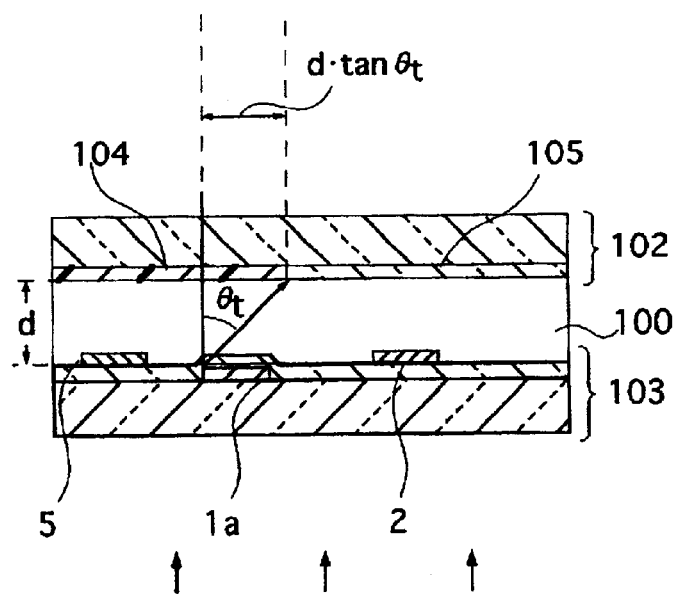
FIG. 12 is a schematic vertical cross-sectional view showing an essential portion of a liquid crystal display panel in accordance with further another embodiment of the present invention.

In order to more effectively shield the light that has transmitted through this region, a black matrix 104 is formed so that the black matrix 104 extends toward the inside of the pixel from the edge of the electrode adjacent to a scanning signal line or an image signal line for a distance $d \cdot \tan \theta_t$, where $\theta_t$ is the angle formed by the normal and a ray of light in the liquid crystal layer and d is the cell gap when total reflection occurs at the liquid crystal display panel-air interface, and in other regions, a color filter layer 105 is formed for display regions, as shown in FIG. 12. Thereby, the light that has transmitted through the region between a signal line and an electrode adjacent thereto is shielded, whereby good display is obtained.

INDUSTRIAL APPLICABILITY

According to the present invention, adverse effects of the signal line potentials on display quality are effectively reduced in a horizontal electric field mode liquid crystal display panel. Therefore, the invention is very useful in providing a liquid crystal display panel which achieves high display quality.

What is claimed is:

1. A liquid crystal display panel comprising:
an array substrate;
a counter substrate opposing the array substrate;
a liquid crystal layer sandwiched between a surface of the array substrate and a surface of the counter substrate;
a plurality of image signal lines located over the surface of the array substrate that is in contact with the liquid crystal layer, the image signal lines being aligned in a same direction;
a plurality of scanning signal lines located over the surface of the array substrate over which the image signal lines are located, the scanning signal lines being located perpendicular to the image signal lines;
a line-shaped pixel electrode located in each of pixel regions of the array substrate that is surrounded by the image signal lines and the scanning signal lines, the pixel electrode located parallel to the image signal lines or to the scanning signal lines;
a common electrode located in each of the pixel regions and located parallel to the pixel electrode;
a switching element for electrically connecting the pixel electrode and one of the image signal lines in response to a signal received from the scanning signal lines;
wherein, of the pixel electrode and the common electrode, the electrode that is located adjacent to and parallel to one of the image signal lines or one of the scanning signal lines comprises an opaque conductor, and at least one of the other electrodes comprises a transparent conductor.

2. The liquid crystal display panel according to claim 1, further comprising an additional electrode comprising a transparent conductor, the additional electrode being located over the array substrate to be parallel to, partially overlapping with, and electrically connected to the electrode that is located adjacent to one of the image signal lines or one of the scanning signal lines.

3. The liquid crystal display panel according to claim 2, wherein an electrode unit comprising a pair of the overlapping electrodes has a surface inclined toward an adjacent electrode.

4. The liquid crystal display panel according to claim 2, wherein a gap between an edge of one of the pair of the overlapping electrodes that is made of a transparent conductor, and one of the signal lines that is perpendicular thereto is smaller than a gap between an edge of the other one of the electrodes that is opaque and the one of the signal lines.

5. The liquid crystal display panel according to claim 1, wherein the electrode that is located adjacent to and parallel to one of the image signal lines or one of the scanning signal lines is the line-shaped common electrode.

6. The liquid crystal display panel according to claim 1, wherein an electrode adjacent to the electrode that is located adjacent to and parallel to one of the image signal lines and one of the scanning signal lines comprises a transparent conductor.

7. The liquid crystal display panel according to claim 1, further comprising an additional line-shaped electrode located on a surface of the counter substrate to oppose one of the image signal lines or one of the scanning signal lines with the liquid crystal layer interposed therebetween and to be parallel to one of the image signal lines or one of the scanning signal lines, the additional line-shaped electrode for having a potential equal to that of an electrode adjacent to one of the image signal lines or one of the scanning signal lines.

8. The liquid crystal display panel according to claim 7, wherein the additional line-shaped electrode comprises a transparent conductor.

9. The liquid crystal display panel according to claim 7, wherein the additional line-shaped electrode covers a region opposing the adjacent electrode.

10. The liquid crystal display panel according to claim 1, further comprising a light shielding member covering a region between the electrode that is disposed adjacent to and parallel to one of the image signal lines or one of the scanning signal lines and one of the image signal lines or one of the scanning signal lines.

11. The liquid crystal display panel according to claim 10, wherein the light shielding member comprises a black matrix located on the counter substrate.

12. The liquid crystal display panel according to claim 10, wherein the light shielding member is located on the array substrate.

13. The liquid crystal display panel according to claim 12, wherein the light shielding member comprises a conductive material.

14. The liquid crystal display panel according to claim 13, wherein the light shielding member is electrically insulated from surrounding members.

15. The liquid crystal display panel according to claim 13, wherein a gap is located between the light shielding member and one of the image signal lines or one of the scanning signal lines that is perpendicular to the light shielding member.

16. The liquid crystal display panel according to claim 15, wherein the gap is larger than a gap between the adjacent electrode and one of the image signal lines or one of the scanning signal lines that is perpendicular to the adjacent electrode.

17. The liquid crystal display panel according to claim 12, wherein the light shielding member is located in a layer lower than that of the electrode that is located adjacent to and parallel to one of the image signal lines or one of the scanning signal lines on the array substrate.

18. The liquid crystal display panel according to claim 10, wherein the light shielding member covers a region between a pair of the electrodes that are adjacent to each other with one of the image signal lines or one of the scanning signal lines located therebetween.

19. The liquid crystal display panel according to claim 1, wherein the electrode that is located adjacent to and parallel to one of the image signal lines or one of the scanning signal lines is the common electrode.

20. The liquid crystal display panel according to claim 1, wherein the common electrodes are located over each of the array substrate and the counter substrate.

21. The liquid crystal display panel according to claim 1, wherein the centerline of the surface of a first electrode that is located adjacent to and parallel to one of the image signal lines or one of the scanning signal lines, is for forming therein an electric flux line of an electric field formed between the first electrode and a second electrode adjacent thereto, such flux line inclined toward the adjacent second electrode with respect to the direction of the normal of the array substrate.

22. The liquid crystal display panel according to claim 21, wherein the upper surface of the first electrode that is located adjacent to and parallel to one of the image signal lines or one of the scanning signal lines is inclined toward the adjacent second electrode.

23. A liquid crystal display panel comprising:
an array substrate;
a counter substrate opposing the array substrate;
a liquid crystal layer sandwiched between a surface of the array substrate and a surface of the counter substrate;
a plurality of image signal lines located over the surface of the array substrate that is in contact with the liquid crystal layer, the image signal lines being aligned in a same direction;
a plurality of scanning signal lines located over surface of the array substrate over which the image signal lines are located, the scanning signal lines being located perpendicular to the image signal lines;
a line-shaped pixel electrode located in each of pixel regions of the array substrate that is surrounded by the image signal lines and the scanning signal lines, the pixel electrode located parallel to the image signal lines or to the scanning signal lines;
a common electrode located in each of the pixel regions and disposed parallel to the pixel electrode;
a switching element for electrically connecting the pixel electrode and one of the image signal lines in response to a signal received from the scanning signal lines;
wherein the centerline of the surface of a first electrode that is located adjacent to and parallel to one of the image signal lines or one of the scanning signal lines, for forming an electric flux line of an electric field formed between the first electrode and a second electrode adjacent thereto, such flux line inclined toward the adjacent second electrode with respect to the direction of the normal of the array substrate.

24. The liquid crystal display panel according to claim 23, wherein the upper surface of the first electrode that is located adjacent to and parallel to one of the image signal lines or one of the scanning signal lines is inclined toward the adjacent second electrode.

25. The liquid crystal display panel according to claim 24, wherein the first electrode that is located adjacent to and parallel to one of the image signal lines or one of the scanning signal lines comprises a pair of electrode members that are located parallel to each other and electrically connected to each other, portions of the electrode members overlapping with each other, and the inclined upper surface includes an upper surface of the electrode member that is located in an upper layer.

26. The liquid crystal display panel according to claim 24, wherein the pair of electrode members are located so as to sandwich an insulating film, and a thickness of the insulating film decreases from a side of the one of the image signal line or the one of the scanning signal lines toward a side of the adjacent second electrode.

27. The liquid crystal display panel according to claim 23, wherein the first electrode that is located adjacent to and parallel to one of the image signal lines or one of the scanning signal lines has a step-shaped upper surface such that a thickness thereof decreases in a stepwise manner toward the adjacent second electrode.

28. The liquid crystal display panel according to claim 1, wherein all the common electrodes are located over the array substrate.

29. A liquid crystal display panel comprising:
an array substrate;
a counter substrate opposing the array substrate;
a liquid crystal layer sandwiched between a surface of the array substrate and a surface of the counter substrate;
a plurality of image signal lines located over the surface of the array substrate that is in contact with the liquid crystal layer, the image signal lines being aligned in a same direction;
a plurality of scanning signal lines located over the surface of the array substrate over which the image signal lines are located, the scanning signal lines being located perpendicular to the image signal lines;
a line-shaped pixel electrode located in each of pixel regions of the array substrate that is surrounded by the image signal lines and the scanning signal lines, the pixel electrode located parallel to the image signal lines or to the scanning signal lines;
a common electrode located in each of the pixel regions and located parallel to the pixel electrode;
a switching element for electrically connecting the pixel electrode and one of the image signal lines in response to a signal received from the scanning signal lines; and
a light shielding member covering a region between the electrode that is located adjacent to and parallel to one of the image signal lines or one of the scanning signal lines and one of the image signal lines or one of the scanning signal lines.

30. The liquid crystal display panel according to claim 29, wherein the light shielding member comprises a black matrix located on the counter substrate.

31. The liquid crystal display panel according to claim 29, wherein the light shielding member is located on the array substrate.

32. The liquid crystal display panel according to claim 31, wherein the light shielding member comprises a conductive material.

33. The liquid crystal display panel according to claim 32, wherein the light shielding member is electrically insulated from surrounding members.

34. The liquid crystal display panel according to claim 32, wherein a gap is located between the light shielding member and one of the image signal lines or one of the scanning signal lines that is perpendicular to the light shielding member.

35. The liquid crystal display panel according to claim 32, wherein the gap is larger than a gap between the adjacent electrode and one of the image signal lines or one of the scanning signal lines that is perpendicular to the adjacent electrode.

36. The liquid crystal display panel according to claim 29, wherein the light shielding member is located in a layer lower than that of the electrode that is located adjacent to and parallel to one of the image signal lines or one of the scanning signal lines on the array substrate.

37. The liquid crystal display panel according to claim 30, wherein the light shielding member covers a region between a pair of the electrodes that are adjacent to each other with one of the image signal lines or one of the scanning signal lines located therebetween.

38. A liquid crystal display panel comprising:

an array substrate;

a counter substrate opposing the array substrate;

a liquid crystal layer sandwiched between a surface of the array substrate and a surface of the counter substrate;

a plurality of image signal lines located over the surface of the array substrate that is in contact with the liquid crystal layer, the image signal lines being aligned in a same direction;

a plurality of scanning signal lines located over the surface of the array substrate over which the image signal lines are located, the scanning signal lines being located perpendicular to the image signal lines;

a line-shaped pixel electrode located in each of pixel regions of the array substrate that is surrounded by the image signal lines and the scanning signal lines, the pixel electrode located parallel to the image signal lines or to the scanning signal lines;

a common electrode located in each of the pixel regions and located parallel to the pixel electrode;

a switching element for electrically connecting the pixel electrode and one of the image signal lines in response to a signal received from the scanning signal lines; and a black matrix located in a region of the counter substrate that opposes the image signal lines or the scanning signal lines, the black matrix covering an area extending from the edge of the electrode adjacent to one of the scanning signal lines or one of the image signal lines for a distance $d \cdot \tan \theta_t$, where d is a thickness of the liquid crystal layer and $\theta_t$ is the angle between the direction of the normal of the surface of the array substrate and the propagating direction of a light that has transmitted through the liquid crystal layer when the light undergoes total reflection at a boundary surface between the device and an outside.

39. The liquid crystal display panel according to claim 38, wherein the black matrix covers a region of the liquid crystal layer in which liquid crystal molecules contained therein are driven by an electric field formed between one of the image signal lines or one of the scanning signal lines and the electrode disposed adjacent to and parallel to the one of the image signal lines or the one of the scanning signal lines.

* * * * *

UNITED STATES PATENT AND TRADEMARK OFFICE
CERTIFICATE OF CORRECTION

PATENT NO. : 6,787,829 B2
DATED : September 7, 2004
INVENTOR(S) : Tetsuo Fukami et al.

It is certified that error appears in the above-identified patent and that said Letters Patent is hereby corrected as shown below:

Title page, Item [54] and Column 1, line 1,
Title, change "LCD PANEL" to -- LIQUID CRYSTAL DISPLAY PANEL --.

Column 13,
Line 38, change "over surface" to -- over the surface --.

Signed and Sealed this

First Day of February, 2005

JON W. DUDAS
*Director of the United States Patent and Trademark Office*